United States Patent [19]

Breault

[11] 4,017,664
[45] Apr. 12, 1977

[54] SILICON CARBIDE ELECTROLYTE RETAINING MATRIX FOR FUEL CELLS
[75] Inventor: Richard D. Breault, Coventry, Conn.
[73] Assignee: United Technologies Corporation, Hartford, Conn.
[22] Filed: Sept. 2, 1975
[21] Appl. No.: 609,867
[52] U.S. Cl. .................................. 429/44
[51] Int. Cl.² ............................... H01M 8/02
[58] Field of Search .......... 136/146, 86 R; 427/58, 427/256, 282; 429/44

[56] References Cited
UNITED STATES PATENTS 3,265,536  8/1966  Miller et al. ................. 136/120 FC
3,575,718  4/1971  Adlhart et al. .................... 136/146
3,875,270  4/1975  Haefner et al. .................... 136/146

Primary Examiner—John H. Mack
Assistant Examiner—H. A. Feeley
Attorney, Agent, or Firm—Stephen E. Revis

[57] ABSTRACT

In a fuel cell utilizing an acid electrolyte, such as $H_3PO_4$, the electrolyte retaining matrix is made from silicon carbide. The silicon carbide has been found to be virtually inert to $H_3PO_4$ at fuel cell operating temperatures and provides all the other necessary and desirable matrix properties. This matrix is expected to have a life of at least 40,000 hours under normal fuel cell operating conditions.

24 Claims, 1 Drawing Figure

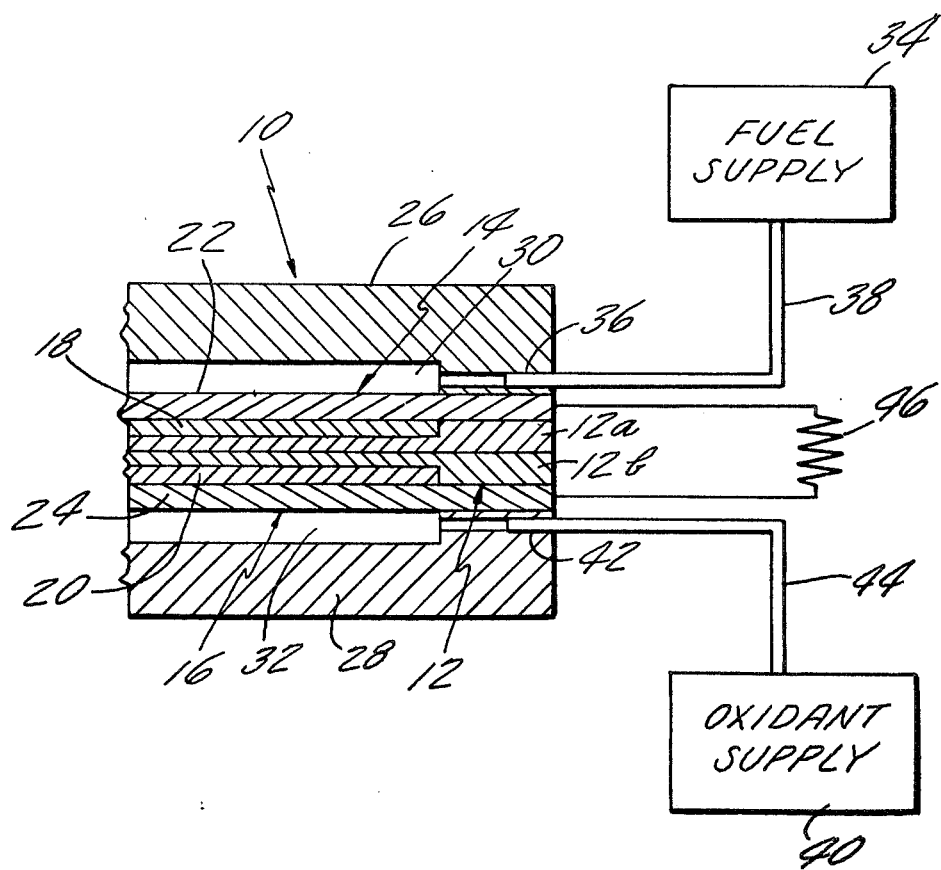

SILICON CARBIDE ELECTROLYTE RETAINING MATRIX FOR FUEL CELLS

BACKGROUND OF THE INVENTION

1. Field of the Invention

This invention relates to fuel cells and more particularly to a matrix for retaining the electrolyte in a phosphoric acid fuel cell.

2. Description of the Prior Art

One type of fuel cell which is well known in the art is a fuel cell using liquid phosphoric acid as the electrolyte retained in a matrix disposed between a pair of gas diffusion electrodes. Typically, a hydrogen containing gas is used as the fuel and an oxygen containing gas, such as air, is used as the oxidant. The electrodes may comprise, for example, a catalyst layer of platinum black mixed with polytetrafluoroethylene, the catalyst layer being disposed on a support of carbon paper impregnated with a wet proofing hydrophobic polymer such as polytetrafluoroethylene.

In order for the electrolyte retaining matrix to perform satisfactorily in this type of cell it must have the following properties: (1) It must be porous and have good liquid permeability; (2) it must be wettable to the electrolyte and provide good ionic conductivity; (3) it must be an electronic insulator; (4) it must be chemically stable in the phosphoric acid electrolyte at fuel cell operating temperatures and at electrode open circuit potentials such that even after 40,000 hours of operation there are no significant generation of materials that will poison the catalyst; (5) it must provide a bubble pressure sufficient to prevent reactant gas crossover; and (6) it should be as thin as possible yet still provide all of the foregoing properties.

One matrix material which has been used in the past is phenolic resin, such as described in U.S. Pat. No. 3,694,310 to Emanuelson et al of common assignee with the present invention. The difficulty with a phenolic resin type of matrix (and matrices made of other types of organic fibers or powders) is that over a long period of time there is a reaction between the phosphoric acid and the organic material at temperatures greater than about 250° F. The reaction produces a molecule which adsorbs onto the electrode catalyst and poisons the catalyst, resulting in performance degradation. Since it is desirable that the basic fuel cell component in a commercial fuel cell power plant operate satisfactorily for 40,000 hours or more without requiring replacement, even a very slow reaction between the acid and the matrix can be quite harmful.

Many other materials, both organic and inorganic have been suggested for use as an acid fuel cell matrix, but all have been deficient in one or more respects, such as by corroding, going into solution with the phosphoric acid, not providing the necessary electronic insulation, or being deficient in such areas as wettability, porosity, or bubble pressure.

Adlhart et al U.S. Pat. No. 3,575,718 discusses the many properties required for a phosphoric acid fuel cell electrolyte member. Adlhart el al found it necessary to construct an electrolyte retaining member of more than one layer, each layer comprising different materials in order that the deficiencies of one layer can be either nullified or provided by the properties in the other layer. This type of matrix construction is expensive and has its limitations.

Presently no prior art phosphoric acid electrolyte matrix material satisfies all of the foregoing properties, is inexpensive, and has the desired long life necessary for commercial fuel cell power plants.

SUMMARY OF THE INVENTION

It is, therefore, a principal object of the present invention to provide a phosphoric acid fuel cell including an improved electrolyte retaining matrix.

According to the present invention an electrolyte retaining matrix is comprised essentially of silicon carbide. In a preferred embodiment, the matrix comprises at least 90% silicon carbide, the balance including a fluorocarbon polymer binder such as polytetrafluoroethylene.

Applicant has discovered that SiC provides all the properties required of a matrix for retaining phosphoric acid electrolyte. It is virtually inert to $H_3PO_4$ at fuel cell operating temperatures up to at least 450° F; it is a non-conductor of electricity at these temperatures at least to the extent necessary for satisfactory cell operation; it is readily wettable; and it can be formed into a matrix which, when filled with electrolyte, has excellent ionic conductivity. The fact that it is stable in the electrolyte at high temperatures permits operation of the cell at higher temperatures than heretofore possible which can translate into higher power output or in the alternative lower catalyst loadings on the electrodes for a given power output.

From the literature currently available which discusses silicon carbide and its properties it is not possible to determine, without actually testing, whether or not silicon carbide would make a suitable matrix for retaining phosphoric acid in a fuel cell. For example, Applicant has found nothing in the literature which indicates specifically that silicon carbide does not react with phosphoric acid at fuel cell operating temperatures of at least 250° F. Although some sources such as Handbook of Chemistry and Physics, Chemical Rubber, 48th Edition (1967–1968) at page B-219, indicate that silicon carbide is resistant to some acids, other sources specifically state that silicon carbide is "completely decomposed at 450° F by phosphoric acid" (see *Abrasive Grain Product Data Bulletin* published by Norton Co., Refractory Division, Worcester, Mass, article titled "Norton Crystolon - Silicon Carbide Grain," p. 3, Item D. 1.c., Jan. 6, 1964). Also, the *Encyclopedia of Chemical Technology*, Interscience Publishers (1963), Vol. 4, pp. 121–124, indicates that silicon carbide is a semi-conductor and an electronic conductor.

In the prior art, the only mention of silicon carbide as a fuel cell matrix material pertains to its use in fuel cells employing alkali electrolytes. This is found in Miller et al U.S. Pat. No. 3,265,536 at column 2, line 61. It has never been recognized as a superior phosphoric acid electrolyte matrix.

The foregoing and other objects, features, and advantages of the present invention will become more apparent in the light of the following detailed description of preferred embodiments thereof as illustrated in the accompanying drawing.

BRIEF DESCRIPTION OF THE DRAWING

The sole FIGURE is a cross section of a fuel cell, greatly enlarged to show detail, and not to scale.

DESCRIPTION OF THE PREFERRED EMBODIMENTS

FIG. 1 shows a fuel cell in cross section designated generally by the numeral 10. The cell 10 comprises a matrix 12 saturated with phosphoric acid electrolyte and confined between a pair of spaced apart gas diffusion electrodes 14, 16, each having a catalytic coating 18, 20, respectively, disposed upon the electrolyte facing surface of a substrate 22, 24, respectively. The electrode/matrix assembly is shown in turn confined between a pair of gas separator plates 26, 28. The plate 26 defines a fuel gas reactant chamber 30 on the nonelectrolyte facing side of the electrode 14; and the plate 28 defines an oxidant reactant gas chamber 32 on the nonelectrolyte facing side of the electrode 16. Fuel, such as hydrogen, from a fuel supply 34 is delivered to the inlet 36 of the chamber 30 via a conduit 38. An oxidant, such as air, from an oxidant supply 40 is delivered to the inlet 42 of the chamber 32 via a conduit 44. The electrodes are shown being connected across a load 46.

In this embodiment the substrates 22, 24 are carbon paper impregnated with a wetproofing agent such as polytetrafluoroethylene. Each catalyst layer 18, 20 is a mixture of a catalyst and a hydrophobic polymer. This layer is applied to the carbon paper substrate by any of the known techniques, such as by spraying or the filtration-transfer technique, for example. It is not considered necessary to describe the electrodes and their manufacture in more detail since they are not considered to be the novel feature of Applicant's invention. Gas diffusion electrodes for use in phosphoric acid electrolyte fuel cells are well known in the art, and the present invention is not intended to be limited to any particular composition or construction thereof.

The feature of the present invention which advances the state of the art is the composition of the matrix 12. The key ingredient of the matrix 12 is silicon carbide in the form of either particles or fibers. However, it has been found that in order to obtain a suitable porosity of at least 50% and a bubble pressure sufficient to prevent gas crossover during normal operation conditions of the cell, the particle size of the silicon carbide must be no greater than 25 microns and preferably less than 10 microns.

The silicon carbide itself can provide all the necessary functions of a phosphoric acid fuel cell matrix without the necessity of any special coatings or barrier layers. Its electrical resistivity under typical operation conditions has been found to be so high as to be inconsequential. For example, a 4 mil thick layer operating at 275° F has a resistivity of $5 \times 10^8$ ohm-cm.

Fuel cells have been constructed and operated using a 100% silicon carbide matrix. However, the silicon carbide tends to shift around within the cell so that a uniform layer is difficult to maintain, thereby causing a reduction in cell performance. It is believed that special cells might be designed and built in order to prevent this shifting around, but in the mean time it is necessary to mix the silicon carbide with a binder. Any binder compatible with phosphoric acid may be used. Preferably the binder is a flurocarbon polymer such as polytetrafluoroethylene (PTFE) or fluorinated ethylene propylene (FEP). The minimum amount of binder necessary to get good bonding of the silicon carbide particles should be used since additional quantities only reduce performance. For example, both PTFE and FEP are hydrophobic, and increased quantities increase the hydrophobicity of the matrix, which is undesirable. It has been determined that the matrix should comprise at least 90% silicon carbide and therefore no more than 10% binder. Preferably the matrix should comprise from 95–98% silicon carbide.

It is possible to form the matrix as a sheet and to position the sheet between the two electrodes; however, it is desirable that the matrix be as thin as possible, preferably less than 5 mils. At these thicknesses the strength and handleability of a sheet would probably be unsatisfactory, and therefore it is preferred to apply the matrix to the surface of the electrode such as by spraying, painting, screen printing or other suitable techniques. In the drawing the matrix 12 is shown as two distinct layers 12a, 12b, a layer being applied to each of the two electrodes; however, the matrix may be a single layer applied to the surface of one electrode but in contact with both electrodes when assembled into a cell.

EXAMPLE I

Ten parts by weight of silicon carbide (Green 1000 Grit from Carborundum Company) and one part by weight of TFE-30 (Dupont's designation for polytetrafluoroethylene) were formed into an aqueous suspension and sprayed onto the surface of the catalyst side of a platinum black/PTFE electrode. The catalyst loading on the electrode was 4 mg/cm$^2$. The silicon carbide used had a particle size of approximately 5 microns. This layer was then dried to remove the water, pressed at 200 psi, and sintered at 590° F for five minutes. The resultant matrix layer contained 5 mg/cm$^2$ of silicon carbide and was 4 mils thick. This layer was an electronic insulator with a resistivity of $5 \times 10^8$ ohm-cm. The matrix layer was totally wetted by 96% H$_3$PO$_4$ at 275° F in one hour. The bubble pressure of a single electrode-matrix combination was 0.5 psig; but when two electrodes were placed together the overall bubble pressure was 1.6 psig. The ohmic losses or iR of the cell were only 21 mv/100 amps/ft$^2$. The following table gives the performance, in volts of a phosphoric acid cell containing two of the foregoing electrodes.

TABLE I

| | CELL VOLTAGE (Volts) | | | |
|---|---|---|---|---|
| REACTANTS | open circuit | 100 amps/ft$^2$ | 200 amps/ft$^2$ | 300 amps/ft$^2$ |
| H$_2$, O$_2$ | 1.008 | 0.813 | 0.755 | 0.707 |
| H$_2$, Air | 0.993 | 0.732 | 0.651 | 0.593 |

The initial performance and iR losses are comparable to cells using conventional matrices; however, a significant improvement in performance stability over time is achieved. Cells of this type have been run for 15,000 hours without significant matrix deterioration or catalysts poisoning. It is expected that this type of matrix structure is capable of a minimum of 40,000 hours life.

EXAMPLE II

A two mil thick matrix layer was applied by screen printing to the surface of each of two electrodes having a catalyst loading of 0.5 mg/cm$^2$ of platinum. The matrix composition was 97% SiC and 3% polytetrafluoroethylene (Dupont's TFE 3170). The SiC had a particle size of approximately 5 microns. The electrodes with the matrix applied thereto were sintered at 590° F for 15 minutes. Cells using these electrodes were evaluated using 102 weight percent $H_3PO_4$ as the electrolyte and $H_2$ and $O_2$ as the reactants, as well as RM-1 (reformed natural gas having the following composition: 80% $H_2$, 1.7% CO and 18.3% $CO_2$) and air as the reactants. The cell iR was 20 mv/100 ASF (amps per square foot) and performance is shown in the following table:

TABLE II

| REACTANTS | CELL VOLTAGE (Volts) | |
| --- | --- | --- |
| | open circuit | 200 ASF |
| $H_2, O_2$ | 0.900 | 0.747 |
| RM-1, Air | — | 0.620 |

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. A fuel cell comprising:
   a pair of spaced apart gas diffusion electrodes;
   a porous electrolyte retaining matrix confined in the space between said electrodes and extending therebetween, and comprising at least 90% silicon carbide; and
   phosphoric acid electrolyte disposed within said matrix.

2. The fuel cell according to claim 1 wherein said matrix includes up to 10% binder.

3. The fuel cell according to claim 2 wherein said binder is a fluorocarbon polymer.

4. The fuel cell according to claim 2 wherein said binder is polytetrafluoroethylene.

5. The fuel cell according to claim 2 wherein said binder is fluorinated ethylene propylene.

6. The fuel cell according to claim 2 wherein said matrix comprises 95%–98% silicon carbide.

7. The fuel cell according to claim 6 wherein said binder is a fluorocarbon polymer.

8. The fuel cell according to claim 7 wherein said polymer is polytetrafluoroethylene or fluorinated ethylene propylene.

9. A fuel cell comprising:
   a pair of spaced apart gas diffusion electrodes;
   a porous electrolyte retaining matrix confined in the space between said electrodes and and extending therebetween consisting essentially of 90%–100% silicon carbide particles and 0–10% binder; and
   phosphoric acid electrolyte disposed within said matrix.

10. The fuel cell according to claim 9 wherein said matrix consists essentially of 95%–98% silicon carbide particles and 2%–5% fluorocarbon polymer binder.

11. The fuel cell according to claim 10 wherein said particles are less than 25 microns in size.

12. The fuel cell according to claim 11 wherein said particles are less than 10 microns in size.

13. A fuel cell comprising:
   a pair of spaced apart gas diffusion electrodes;
   an electrolyte retaining matrix confined in the space between said electrodes and extending therebetween, said matrix consisting essentially of 95%–98% silicon carbide particles and 2%–5% of either polytetrafluoroethylene or fluorinated ethylene propylene as a binder for said particles; and
   phosphoric acid electrolyte disposed within said matrix.

14. The fuel cell according to claim 13 wherein said particles are less than 10 microns in size.

15. A method for making a phosphoric acid fuel cell, said fuel cell including a pair of spaced apart gas diffusion electrodes separated by and each in contact with a matrix, including the step of:
   making said matrix by
   1. forming an aqueous suspension including at least nine parts silicon carbide for every one part binder;
   2. applying said suspension to the surface of at least one of said electrodes to form a layer thereon;
   3. drying and sintering said layer; and
   4. impregnating said matrix with phosphoric acid.

16. The method according to claim 15 wherein said aqueous suspension includes 9.5–9.8 parts silicon carbide for every 0.2–0.5 parts fluorocarbon polymer binder.

17. The method according to claim 15 wherein said silicon carbide in said suspension consists of particles less than 25 microns in size.

18. The method according to claim 15 wherein said silicon carbide in said suspension consists of particles less than 10 microns in size.

19. A method for making a phosphoric acid fuel cell, said fuel cell including a pair of spaced apart gas diffusion electrodes separated by and each in contact with a matrix, including the step of:
   making said matrix by
   1. forming an aqueous suspension including 9.5–9.8 parts silicon carbide for every 0.2–0.5 parts fluorocarbon polymer binder, said silicon carbide consisting of particles less than 10 microns in size;
   2. applying said suspension to the surface of at least one of said electrodes to form a layer thereon;
   3. drying and sintering said layer; and
   4. impregnating said matrix with phosphoric acid.

20. In the process of generating electricity with a fuel cell, said fuel cell including a pair of spaced apart gas diffusion electrodes separated by and each in contact with a matrix filled with phosphoric acid electrolyte and means defining a fuel gas chamber on the non-matrix side of one of said electrode elements and an oxidant gas chamber on the non-matrix side of the other of said electrode elements, including the steps of:
   connecting said electrode elements across a load;
   passing a fuel through said fuel gas chamber; and
   passing an oxidant through said oxidant gas chamber, wherein said matrix consists essentially of 90–100% silicon carbide and 10–0% binder.

21. The process of generating electricity according to claim 20 wherein said binder is a fluorocarbon polymer.

22. The process of generating electricity according to claim 20 wherein said matrix consists essentially of 95%–98% silicon carbide particles and 2%–5% fluorocarbon polymer binder.

23. The process of generating electricity according to claim 20 wherein said particles are less than 25 microns in size.

24. The process of generating electricity according to claim 20 wherein said particles are less than 10 microns in size.

* * * * *